United States Patent
Hidding et al.

(10) Patent No.: US 6,338,076 B1
(45) Date of Patent: Jan. 8, 2002

(54) METHOD FOR PREPARING A DOCUMENT INVOLVING THE USE OF FINISHING INSTRUCTIONS

(75) Inventors: Gerhard Hidding, Heerenveen; Bertus Karel Edens, Drachten, both of (NL)

(73) Assignee: Hadewe B.V., Drachten (NL)

( * ) Notice: Subject to any disclaimer, the term of this patent is extended or adjusted under 35 U.S.C. 154(b) by 0 days.

(21) Appl. No.: 09/001,811

(22) Filed: Dec. 31, 1997

(30) Foreign Application Priority Data

Dec. 31, 1996 (NL) ............................................. 1004918

(51) Int. Cl.$^7$ .............................................. G06F 17/21
(52) U.S. Cl. ........................ 707/530; 707/517; 707/522
(58) Field of Search ................................ 707/530, 505, 707/507, 522, 517; 395/111, 117

(56) References Cited

U.S. PATENT DOCUMENTS

| | | | | |
|---|---|---|---|---|
| 5,222,236 A | | 6/1993 | Potash et al. ................ 707/102 |
| 5,267,155 A | * | 11/1993 | Buchanan et al. .......... 707/540 |
| 5,271,065 A | * | 12/1993 | Rourke et al. ............... 707/525 |
| 5,379,368 A | | 1/1995 | Imai et al. ................... 395/117 |
| 5,432,899 A | * | 7/1995 | Iwatani et al. .............. 395/145 |
| 5,459,826 A | * | 10/1995 | Archibald .................... 707/517 |
| 5,615,316 A | * | 3/1997 | Imai et al. ................... 395/117 |
| 5,729,751 A | * | 3/1998 | Schoolcraft .................. 707/530 |
| 5,809,218 A | * | 9/1998 | Kastenholz et al. ........ 395/115 |
| 5,860,073 A | * | 1/1999 | Ferrel et al. ................. 707/522 |
| 5,893,129 A | * | 4/1999 | Pollar .......................... 707/522 |
| 5,893,914 A | * | 4/1999 | Clapp .......................... 707/507 |

FOREIGN PATENT DOCUMENTS

| | | |
|---|---|---|
| EP | 0 282 359 | 9/1988 |
| EP | 0 628 357 | 12/1994 |
| EP | 0 719 597 | 7/1996 |

* cited by examiner

*Primary Examiner*—Stephen S. Hong
(74) *Attorney, Agent, or Firm*—Burns, Doane, Swecker & Mathis, L.L.P.

(57) ABSTRACT

In preparing a document, digital document data are generated which contain an information content (IC) and finishing instructions (FI), other than the information content (IC), for finishing the document. The document data is fed to an apparatus for preparing and finishing documents, where the preparation and finishing of the document are carried out in accordance with the document data and whereby the information content (IC) is provided on an information carrier. The document is composed of at least two sections (S1–S5), each divided into an information content (IC) and at least one finishing code (FC) which represents at least one finishing setting. Determining the finishing instructions (FI) for preparing the document proceeds in accordance with the finishing codes (FC) associated with the sections (S1–S5).

21 Claims, 2 Drawing Sheets

FIG. 2

METHOD FOR PREPARING A DOCUMENT INVOLVING THE USE OF FINISHING INSTRUCTIONS

FIELD AND BACKGROUND OF THE INVENTION

This invention relates to a method for preparing a document, comprising the steps of generating digital document data for the document, containing an information content and finishing instructions, other than the information content, for finishing the document, feeding the document data to an apparatus for preparing and finishing documents, and preparing and finishing the document in accordance with the document data, whereby the information content is provided on an information carrier.

Such a method is described in European patent application with publication number 0628357. It discloses the linking of the finishing instructions in digital form to digital data representing a text of a document, for instance by determining the finishing instructions for a document on the basis of portions of the contents of that document (such as name-address-residence, a customer code or a post code) which refer to predetermined finishing instructions. These finishing instructions are stored as part of a separate file to be used for several documents.

Although for special applications the finishing instructions associated with a document can thus be partly determined by the information content of that document as such, it is generally laborious to generate finishing instructions again and again for each document or each series of documents and also, in each instance this entails the risk of mistakes regardless of whether documents are involved that are to be produced as a single item or in small or large numbers. This applies in particular if the document is a document composed of several components, which moreover is to be packaged. In particular if the number of options from which finishing instructions are to be selected is very large, for instance because the physical production of documents is contracted out for logistic reasons or reasons of production economy, it is laborious to determine finishing instructions again and again for each order or for each document.

For that matter, in practice it is customary that the finishing instructions for the preparation of documents are set as job instructions applying to a series of documents that are being prepared within the framework of that job. This applies especially to the preparation of items to be mailed, where the documents are packaged in envelopes. This method is even more laborious, because even in the preparation of a document or a number of documents of a type which has been prepared before, all settings must be set again, at any rate, must be checked. This applies in particular if the further documents are to be prepared in an apparatus with different options.

SUMMARY OF THE INVENTION

The object of the invention is to provide a method which enables the determination of finishing instructions for the preparation of documents to be carried out more efficiently and with less risk of mistakes.

According to the present application, this object is realized by composing the document from at least two sections each divided into an information content and at least one finishing code which represents at least one finishing setting, and determining the finishing instructions for preparing the document in accordance with the finishing codes associated with the sections.

This provides the possibility, in generating a new document, of re-using a section, such as part of a text, a picture or a printing on an enclosure document, if desired with a wholly or partly modified information content, including the finishing setting selected for that section, in the form of the finishing code or codes of that section, so that at least a basis for the finishing instructions is automatically carried along. This eliminates the necessity of determining, or at least checking, again and again a substantial part of the finishing instructions of documents.

In maintaining certain procedural measures, such as a house style, the possibility is offered of preventing selected finishing settings, such as the choice from different kinds of letter paper, from being modified by unauthorized persons.

A further advantage is that in the repetitive preparation and/or preparation at distributed points of documents of a certain kind with different limitations regarding finishing options, it is possible to automatically achieve a flexible matching of, on the one hand, the finishing requirements imposed by certain parts of that document or that kind of documents and, on the other, the finishing options.

It is noted that a document can be a printed document as well as an information carrier on which information is stored in a different form. It is further noted that in this context 'document', is understood to be a document in a broad sense, i.e. the totality of items, possibly including an envelope, which it is desired to send as an assembly to an addressee.

Hereinafter the invention as well as further elaborations and advantages thereof will be further explained and elucidated. on the basis of an exemplary embodiment presently preferred most and some alternative possibilities, with reference to the drawings.

DETAILED DESCRIPTION

Figure 1:
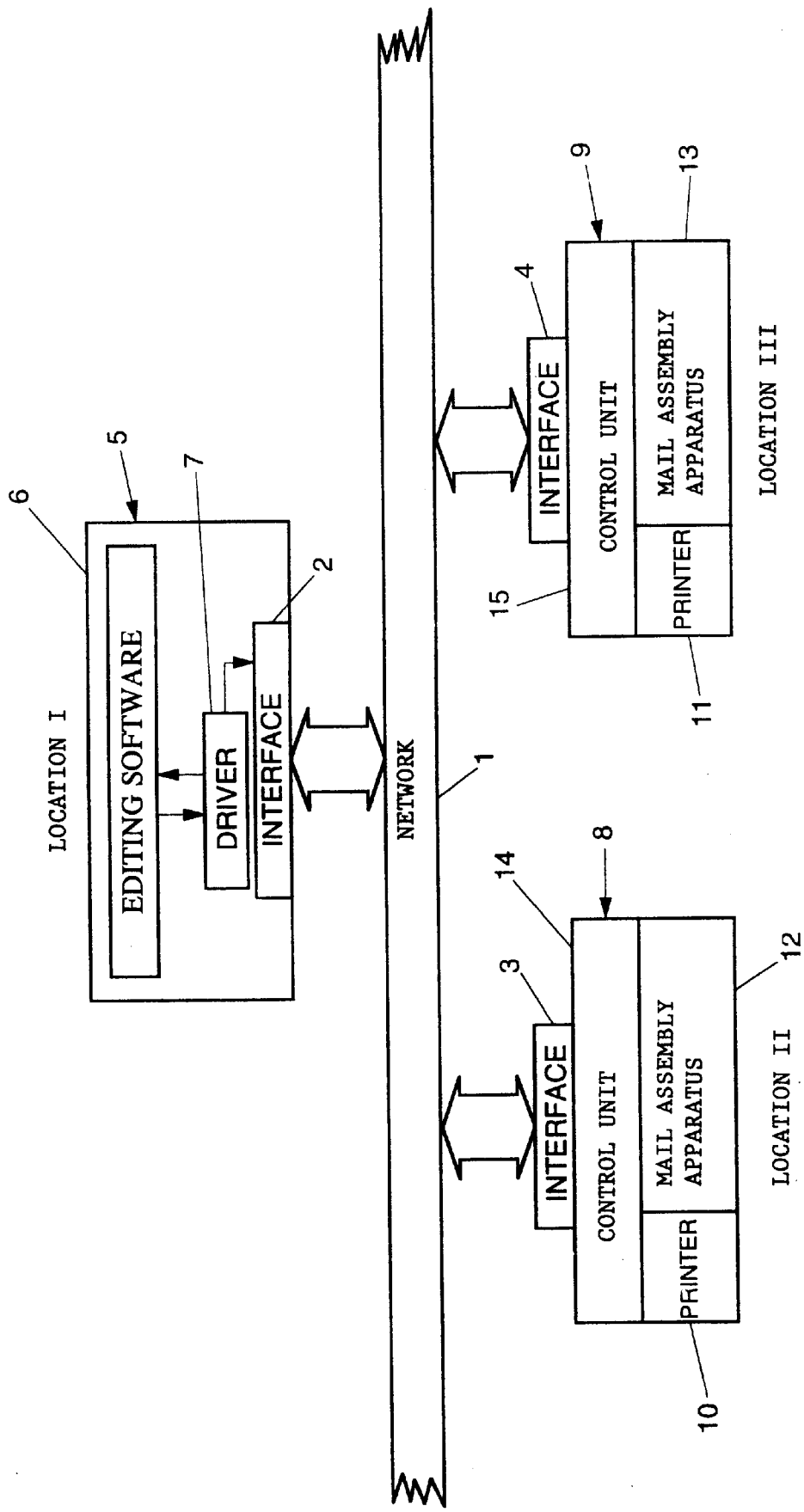
FIG. 1 is a schematic representation of a configuration for practicing the method according to the invention.

The practical example of the present invention, described by way of example, concerns a situation in which documents are generated in a location I and are produced at different locations, including locations II and III, in order to limit delays and costs associated with the physical distribution of documents over large distances. Such a service can be offered, for instance, by a Post Office or a courier agency or be used for internal and external communication within a large organization with many branches that depend on highly up-to-date information, such as banks.

The locations I, II and III are linked to a network 1 and each equipped with an interface 2, 3, 4 suitable for that purpose. The network can be formed, for instance, by a telephone network, but can also, or supplementarily, be formed by another network, such as an intranet or a communication system suitable for data communication, which may or may not be partly or wholly wireless. At location I, a word processing unit is present in the form of a data processor system 5, in which editing software 6, such as a word processing program and/or, if desired, a DTP (desktop publishing) program is installed. Further installed in the data processor system 5 is driver software 7, which serves for converting data concerning a document into document data 8 which can be transmitted to locations II and III.

The locations II and III are each formed by a system 8, 9 for preparing postal items, which is made up of a printer 10, 11 and a mail assembly apparatus 12, 13 connected in-line to the printer 10, 11, as well as a control system 14, 15 for controlling the printer 10, 11 and the mail assembly apparatus 12, 13 in response to signals received via the network 1 and the interface 3, 4 in question. Integrated systems for printing and finishing postal items have been described in many publications and have meanwhile become commercially available. For particular aspects, reference is made to the European patent applications published under numbers 0404264 (U.S. Pat. No. 5,283,752), 0406976 (U.S. Pat. No. 5,555,703), 0556922 (U.S. Pat. No. 5,556,086) and 0676349 (U.S. Pat. No. 5,584,472).

Figure 2:
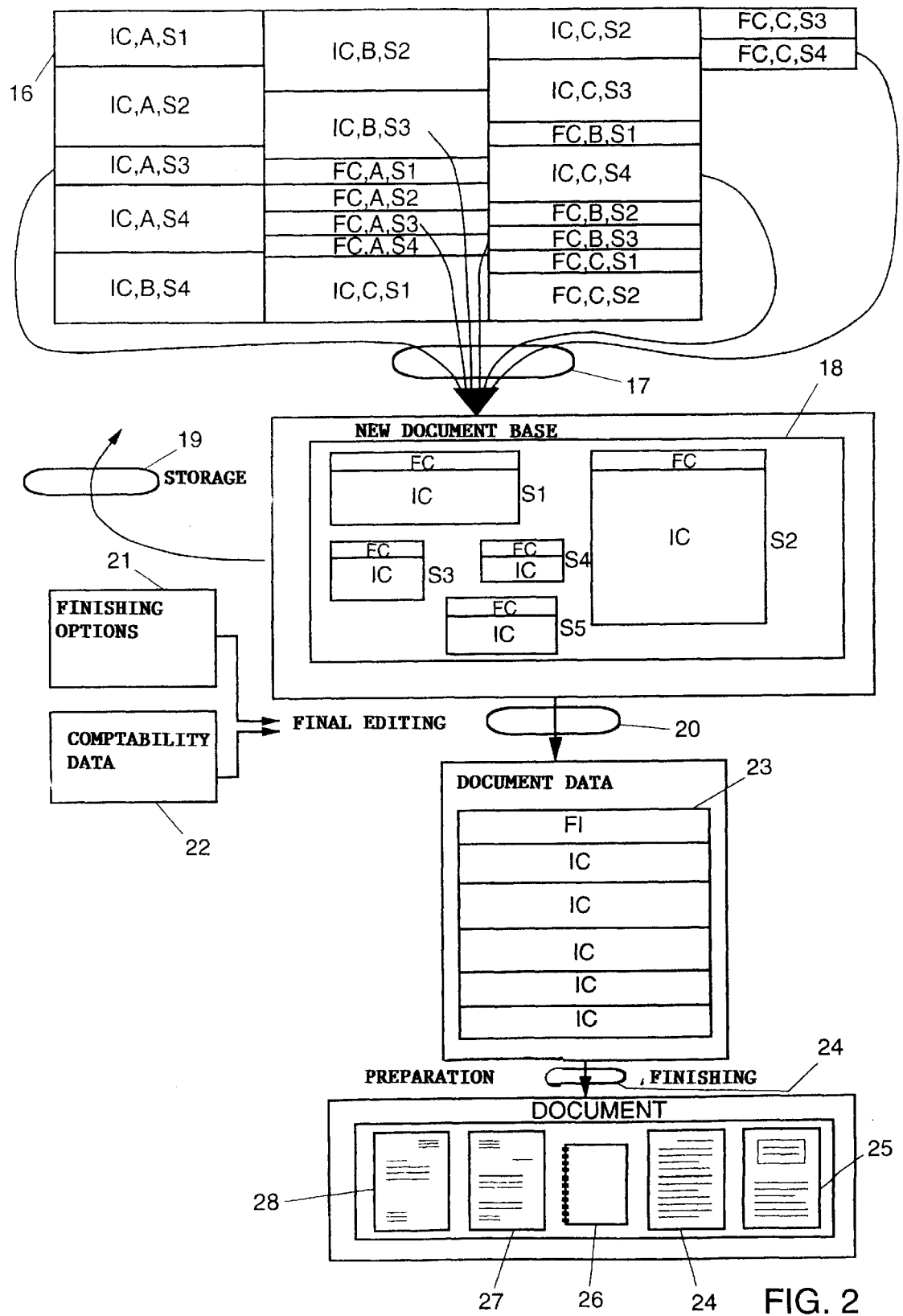
FIG. 2 is a schematic representation of an example of a mode of carrying out the method according to the invention.

To clarify the method of preparing a document as proposed here, reference is made to FIG. 2, where a method step is represented as an oval, while initial data as well as intermediate and end results are represented as rectangles.

The starting-point of the present example is a situation in which a file 16 with data of various sections is available. These sections are designated with a code A, B or C, indicating to what document they belong. This document can be a document which has been prepared before, but it can also be a template document. Further, the number of the section is indicated by a code S1, S2, S3 or S4. The first code, which is IC for information content or FC for finishing codes, indicates whether what is involved is the portion of the section containing the information content, at least a possibility of filling in the information content, or the portion of the section containing the finishing codes. The finishing codes concern the lay-out of the document in a broad sense, such as settings regarding the material on which the information is to be provided (for instance, the type of paper or film), the manner in which folding is to proceed, the enclosures which are to be added, the binding, if so desired, of two or more of the printed sheets, the manner of dispatch or the printing to be applied to the envelope.

According to the present example, in the document composition step indicated by reference numeral 17, the starting-point is section S3 of document A, section S3 of document B and section S4 of document C. These sections are adapted as to information content IC to the specific information to be transmitted through the new document. Optionally, the finishing codes can also be modified, but in general this is precisely what will not be necessary if a suitable section is started from. According to the present example, starting from the three sections mentioned, a document base 18 is composed which is made up of five sections. These can be based on the original three sections, but can also comprise newly created sections.

It is noted that it is obviously preferred to use all sections of a previous document or a model document if a document base for a document of the same kind is being composed. The present example, however, concerns generating a new document which is based on portions from three previous documents.

When the document base 18 is ready, it can be added to the file 16, as is indicated by step 19.

What follows is step 20, designated 'final editing', during which step the document data 23 with the finishing instructions FI for preparing the document are determined in accordance with the finishing codes FC associated with the sections S1–S5.

Determining the finishing instructions is further carried out on the basis of the algorithms installed as driver 7. Here, account is taken of finishing options 21 associated with the selected location II or III where the document is to be prepared, and of compatibility data 22 indicating to what extent different finishing codes for a certain document are mutually compatible.

The finishing options are retrieved from the selected location II, III via the network 1, preferably just before the moment at which the document data 23 are generated. Thus the finishing instructions can be generated in accordance with the operations and starting materials available at a given time at the selected location II, III.

If in generating the finishing instructions it appears that some finishing codes are in conflict with each other or with available finishing options, the driver software 7 can, for instance, provide for the generation of a 'setting conflict' signal or an 'inexecutable' signal, and, in response thereto, of a request to the operator to choose from one or more alternatives to the inexecutable finishing code, or to specify an alternative. However, this can also occur automatically if certain alternatives to a preferred finishing code have been specified already in generating a section. Subsequently, the finishing instructions can then be determined in accordance with the inputted alternative finishing setting.

By storing a specified alternative finishing setting as an alternative finishing code associated with the finishing code that resulted in a conflict as regards compatibility or finishing options, the alternative will be automatically available in the event of subsequent use of the same section, or a section based on that section, so that in case of a conflict the alternative can be proposed without user intervention, just like a priorly inputted alternative finishing setting.

Preferably, in such a situation, it is subsequently verified automatically under control of the driver 7 whether the proposed alternative is actually compatible with the other finishing codes and, having regard to the available finishing options, is executable.

When the document data 23 have been generated, the next step is to proceed to the preparation and finishing of the document or series of documents, as is indicated by step 24.

This step starts with the supply of the document data 23 via the network 1 to a selected one of the systems 8, 9 for preparing postal items, whereafter the document is prepared and finished in accordance with the document data 23. As for the document according to the present example, the result is that a document consisting of two sheets 24, 25 will have printed thereon a text as specified in a section S1 and a picture as specified in a section S2. The selected paper quality and the kind of printer to be used have been included in the finishing instructions on the basis of the finishing codes of the section S2. Section S3 provides for the printing and binding of an enclosure 26 and further contains, in view of the non-foldable binding spine being formed, the imperative finishing code that no folding should take place and that an envelope of at least size C4 is to be used for packaging. In accordance with what has been determined in generating section S4, an enclosure 27 is printed. Section S5, finally, specifies the printing and the size of the envelope. If a size smaller than C4 had been specified, a conflict with the minimum size specified in section S3 would have arisen and the driver 7 would have asked that a larger size of envelope and an adapted lay-out be specified in section S5.

The example described concerns an application in the context of divided printing and finishing, but the proposed method is generally highly suitable for other applications as well, such as generating instructions-for-use in different variants for different, but largely identical, series- or mass-produced appliances, generating insurance policies with mutually identical portions, as well as mutually different clauses and different enclosures, and generating corresponding documents in different languages.

In general, the proposed method can be used with advantage especially if, starting from at least one of the sections of a previous document or a model document, it is possible repeatedly to determine the finishing codes for a next, deviating document.

A particular advantage of the method is that the finishing instructions allow of relatively flexible adjustment to different finishing options available at each location or at different moments. In preparing a next document whose finishing codes are section-wise identical to the finishing codes of a previously prepared document, it is possible for deviating data concerning finishing options to lead, for instance, to a situation where the finishing instructions for that next document still differ from the finishing instructions of the previously prepared document and thus have automatically been adapted to the available finishing options. Practical examples of such deviating finishing instructions are, for instance, the printing on folio or quarto size if no A4 size is available and the automatic packaging in associated envelopes, or a switch from packaging in window envelopes to packaging in addressed envelopes.

In the example described, the sections S1–S5 of the document base contain finishing codes for the preparation of several separate items, and a document is prepared in accordance with finishing instructions which have been determined in accordance with these finishing codes. Information is thereby provided on several separate information carriers and those information carriers are joined. Thus the proposed method provides the possibility of preparing document assemblies with several individualized items and replacing these modularly.

In addition to serving for instructions for an inserter system with in-line printing facilities, the finishing codes can also serve for other purposes. Thus, the finishing codes can, for instance, contain an authenticity check, thereby preventing the possibility of sections ending up in documents in a form modified by unauthorized persons. Protecting only sections from alteration still leaves sufficient freedom, in respect of the portion of the document that does allow of modification, to adapt such portion to, for instance, the situation of the addressee. For a description of ways in which documents can be protected against unauthorized alteration, reference is made to the book PGP; Pretty Good Privacy, Simson Garfinkel, O'Reilly & Associates Inc., USA, 1995, ISBN: 1-56592-098-8, in particular pages 17–21. By including the verification algorithms in the driver 7, sections modified without authorization are prevented from reaching the stage of document data 23. Verification of the sections can take place, for instance, during the final editing 20 under the control of the driver 7 or upon reception at the location II or III where the document is to be prepared.

Another possibility provided by the finishing codes associated with sections is the classification of texts and portions thereof, as well as of pictures, into different grades of confidentiality. Thus, a finishing code "confidential" associated with a first section, in combination with a finishing code associated with another section containing a different confidentiality grade associated with an address to be printed on an envelope can result in a 'setting conflict' signal, which prevents the section in question spreading outside the confidentiality circle.

Another possible application of finishing codes associated with sections is controlling a reproduction counter associated with an information source. Depending on finishing codes, the finishing instructions can be produced for the purpose of generating reproduction data in the preparation of the document. This data can subsequently serve as a basis for the calculation of the remuneration of the makers of the various sections.

What is claimed is:

1. A method for preparing a document, comprising:
   generating digital document data for a document, containing an information content and finishing instructions, other than said information content, for finishing said document, said document data including at least two sections each divided into an information content and at least one finishing code which represents at least one finishing setting;
   determining the finishing instructions for finishing said document in accordance with the finishing codes associated with said sections
   feeding said document data to an apparatus for preparing and finishing documents,
   preparing and finishing the document in accordance with said document data, whereby information is stored on an information carrier in accordance with said information content and said information carrier carrying said stored information is subsequently finished in accordance with said finishing instructions, said finishing instructions being instructions regarding at least one of a kind of printer to be used, an authenticity check, classification concerning grade of confidentiality, control of a reproduction counter, instructions for an inserter station, enclosures to be added, binding, folding, printing to be applied to an envelope, and packaging.

2. The method according to claim 1, further comprising determining finishing instructions for finishing a further, deviating document, from the finishing codes of at least one of said sections.

3. The method according to claim 1, wherein the finishing instructions are partly determined depending on data concerning available finishing options.

4. A method according to claim 1, wherein the finishing codes of at least one of the sections include at least one preferred finishing code and an associated, alternative finishing code, further comprising, in case of a conflict between a preferred finishing setting represented by said at least one preferred finishing code and a finishing setting represented by a finishing code of another one of said sections, the steps of generating a 'setting conflict' signal and, in response to said 'setting conflict' signal, determining said finishing instructions in accordance with said alternative finishing code instead of in accordance with said preferred finishing code.

5. A method according to claim 1, further comprising, in case of a conflict between a finishing setting represented by a finishing code of one of said sections and a finishing setting represented by a finishing code of another one of said sections, the steps of generating a request for input of an alternative finishing setting for at least one of the conflicting finishing settings, inputting an alternative finishing setting, and determining the finishing instructions in accordance with said inputted alternative finishing setting.

6. A method according to claim 5, wherein a finishing code which represents said inputted alternative finishing setting is added to a section as an alternative finishing code associated with a finishing code which represents one of said conflicting finishing settings.

7. A method according to claim 1, wherein the finishing instructions are partly determined depending on data concerning available finishing options.

8. A method according to claim 7, wherein the finishing codes of at least one of the sections include at least one preferred finishing code and an associated, alternative finishing code, further comprising, in case of a conflict between a preferred finishing setting represented by said at least one preferred finishing code and said data concerning available finishing options, the steps of generating an 'inexecutable' signal and, in response to an 'inexecutable' signal, determining said finishing instructions in accordance with said alternative finishing code instead of in accordance with said preferred finishing code.

9. A method according to claim 7, further comprising, in case of a conflict between a finishing setting and the data concerning available finishing options, the steps of generating an 'inexecutable' signal, generating in response to said 'inexecutable' signal a request for input of an alternative finishing setting, inputting an alternative finishing setting, and determining said finishing instructions in accordance with said inputted alternative finishing setting.

10. A method according to claim 9, wherein a finishing code which represents said inputted alternative finishing setting is added to a section as an alternative finishing code associated with a finishing code which represents said conflicting finishing setting.

11. A method for preparing a document, comprising:
   generating digital document data for a document, containing an information content and finishing instructions, other than said information content, for finishing said document, said document data including at least two sections each divided into an information content and at least one finishing code which represents at least one finishing setting;
   determining the finishing instructions for finishing said document in accordance with the finishing codes associated with said sections;
   feeding said document data to an apparatus for preparing and finishing documents;
   preparing and finishing the document in accordance with said document data, whereby information is printed on an information carrier in accordance with said information content and said information carrier carrying said printed information is subsequently finished in accordance with said finishing instructions; and
   preparing a next document, the finishing instructions for said next document being determined in accordance with finishing codes which are section-wise identical to the finishing codes of the document mentioned earlier and in accordance with deviating data concerning finishing options, and the finishing instructions for said next document deviating from the finishing instructions of the document mentioned earlier,
   wherein the finishing instructions are partly determined depending on data concerning available finishing options.

12. A method according to claim 1, wherein the finishing codes of said sections represent at least finishing settings for controlling an inserter system, including instructions concerning the supply of enclosures, the folding of a document, the binding of sheets or the selection of an envelope, further comprising the steps of determining at least partly in accordance with said finishing codes finishing instructions intended for an inserter system, and finishing the constituent parts of said document in an inserter system, said inserter system being controlled in accordance with said finishing instructions.

13. A method according to claim 1, wherein said sections contain finishing codes for the preparation of at least two separate items, and in the preparation of a document in accordance with finishing instructions which have been determined in accordance with said finishing codes, information is provided on at least two separate information carriers and those information carriers are put together.

14. A method according to claim 1, wherein the finishing codes of said sections represent at least finishing settings for controlling a verification system, further comprising the steps of determining at least partly in accordance with said finishing codes finishing instructions intended for a verification system, and verifying the information content of at least one section in accordance with said finishing instructions.

15. A method for preparing a document, comprising:
   generating digital document data for a document, containing an information content and finishing instructions, other than said information content, for finishing said document, said document data including at least two sections each divided into an information content and at least one finishing code which represents at least one finishing setting;
   determining the finishing instructions for finishing said document in accordance with the finishing codes associated with said sections;
   feeding said document data to an apparatus for preparing and finishing documents;
   preparing and finishing the document in accordance with said document data, whereby information is printed on an information carrier in accordance with said information content and said information carrier carrying said printed information is subsequently finished in accordance with said finishing instructions,
   wherein the finishing codes of said sections represent at least finishing settings for controlling a reproduction counter associated with an information source; and
   determining at least partly in accordance with said finishing codes finishing instructions intended for generating reproduction data and, in the preparation of said document, generating reproduction data in accordance with said finishing instructions.

16. A method for preparing a document, comprising:
   generating digital document data for said document, containing an information content and finishing instructions, other than said information content, for finishing said document,
   feeding said document data to an apparatus for preparing and finishing documents, and
   preparing and finishing the document in accordance with said document data, whereby information is stored on an information carrier in accordance with said information content;
   said document data including at least two sections each divided into an information content and at least one finishing code which represents at least one finishing setting,
   the finishing instructions for preparing said document being determined in accordance with the finishing codes associated with said sections;
   the finishing codes of at least one of the sections including at least one preferred finishing code and an associated, alternative finishing code, and
   in case of a conflict between a preferred finishing setting represented by said at least one preferred finishing code and a finishing setting represented by a finishing code of another one of said sections, generating a 'setting conflict' signal and, in response to said 'setting conflict' signal, determining said finishing instructions in accordance with said alternative finishing code instead of in accordance with said preferred finishing code.

17. A method for preparing a document, comprising:

generating digital document data for a document, containing an information content and finishing instructions, other than said information content, for finishing said document, feeding said document data to an apparatus for preparing and finishing documents, preparing and finishing the document in accordance with said document data, whereby information is stored on an information carrier in accordance with said information content, said document data including at least two sections each divided into an information content and at least one finishing code which represents at least one finishing setting, the finishing instructions for preparing said document being determined in accordance with the finishing codes associated with said sections, and in case of a conflict between a finishing setting represented by a finishing code of one of said sections and a finishing setting represented by a finishing code of another one of said sections, generating a request for input of an alternative finishing setting for at least one of the conflicting finishing settings, inputting an alternative finishing setting, and determining the finishing instructions in accordance with said inputted alternative finishing setting.

18. A method for preparing a document, comprising:

generating digital document data for a document, containing an information content and finishing instructions, other than said information content, for finishing said document, feeding said document data to an apparatus for preparing and finishing documents, preparing and finishing the document in accordance with said document data, whereby information is stored on an information carrier in accordance with said information content, said document data including at least two sections each divided into an information content and at least one finishing code which represents at least one finishing setting, the finishing instructions for preparing said document being determined in accordance with the finishing codes associated with said sections;

the finishing instructions being partly determined depending on data concerning available finishing options, the finishing codes of at least one of the section including at least one preferred finishing code and an associated, alternative finishing code, and in case of a conflict between a preferred finishing setting represented by said at least one preferred finishing code and said data concerning available finishing options, generating an 'inexecutable' signal and, in response to the 'inexecutable' signal, determining said finishing instructions in accordance with said alternative finishing code instead of in accordance with said preferred finishing code.

19. A method for preparing a document, comprising:

generating digital document data for a document, containing an information content and finishing instructions, other than said information content, for finishing said document, feeding said document data to an apparatus for preparing and finishing documents, and preparing and finishing the document in accordance with said document data, whereby information is stored on an information carrier in accordance with said information content;

said document data including at least two sections each divided into an information content and at least one finishing code which represents at least one finishing setting, wherein the finishing instructions for preparing said document are determined in accordance with the finishing codes associated with said sections;

wherein the finishing instructions are partly determined depending on data concerning available finishing options;

in case of a conflict between a finishing setting and the data concerning available finishing options, generating an 'inexecutable' signal, generating in response to said 'inexecutable' signal a request for input of an alternative finishing setting, inputting an alternative finishing setting, and determining said finishing instructions in accordance with said inputted alternative finishing setting.

20. A method for preparing a document, comprising:

generating digital document data for a document, containing an information content and finishing instructions, other than said information content, for finishing said document, feeding said document data to an apparatus for preparing and finishing documents, preparing and finishing the document in accordance with said document data, whereby information is stored on an information carrier in accordance with said information content;

said document data including at least two sections each divided into an information content and at least one finishing code which represents at least one finishing setting, the finishing instructions for preparing said document being determined in accordance with the finishing codes associated with said sections;

the finishing codes of said sections representing at least finishing settings for controlling a verification system, and determining at least partly in accordance with said finishing codes finishing instructions intended for the verification system, and verifying the information content of at least one section in accordance with said finishing instructions.

21. A method for preparing a document, comprising:

generating digital document data for said document, containing an information content and finishing instructions, other than said information content, for finishing said document, feeding said document data to an apparatus for preparing and finishing documents, preparing and finishing the document in accordance with said document data, whereby information is stored on an information carrier in accordance with said information content;

said document data including at least two sections each divided into an information content and at least one finishing code which represents at least one finishing setting, the finishing instructions for preparing said document being determined in accordance with the finishing codes associated with said sections, the finishing codes of said sections represent at least finishing settings for controlling a reproduction counter associated with an information source, and determining at least partly in accordance with said finishing codes finishing instructions intended for generating reproduction data and, in the preparation of said document, generating reproduction data in accordance with said finishing instructions.

* * * * *